United States Patent
Wada et al.

(10) Patent No.: US 6,620,284 B2
(45) Date of Patent: Sep. 16, 2003

(54) EVEN PRESSURE WELDING METHOD BY USING FLUID PRESSURE

(75) Inventors: Koji Wada, Tsukuba-gun (JP); Katsumi Iijima, Tsukuba-gun (JP); Yutaka Yoshida, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 148 days.

(21) Appl. No.: 09/906,711

(22) Filed: Jul. 18, 2001

(65) Prior Publication Data

US 2002/0062914 A1 May 30, 2002

(30) Foreign Application Priority Data

Aug. 3, 2000 (JP) .......................... 2000-235799

(51) Int. Cl.⁷ .................. B29C 65/00; B29C 43/10; B32B 31/20
(52) U.S. Cl. .................. 156/285; 156/286; 156/382; 264/510; 264/511; 264/570; 264/248; 264/258
(58) Field of Search .................. 264/257, 258, 264/510, 511, 570, 248; 156/285, 286, 382

(56) References Cited

U.S. PATENT DOCUMENTS

| | | | | |
|---|---|---|---|---|
| 4,656,002 A | * | 4/1987 | Lizenby et al. | 419/10 |
| 4,701,291 A | | 10/1987 | Wissman | |
| 4,749,421 A | * | 6/1988 | Matsui et al. | 156/89 |
| 4,824,509 A | * | 4/1989 | Tonoki et al. | 156/285 |
| 4,851,280 A | * | 7/1989 | Gupta | 428/246 |
| 4,883,632 A | * | 11/1989 | Goto et al. | 264/544 |
| 5,507,896 A | * | 4/1996 | Yoshimura et al. | 156/89 |
| 6,017,484 A | * | 1/2000 | Hale | 264/510 |
| 6,267,920 B1 | * | 7/2001 | Arakawa et al. | 264/570 |

FOREIGN PATENT DOCUMENTS

| | | |
|---|---|---|
| DE | 196 12 210 | 10/1997 |
| DE | 199 51 662 | 4/2000 |
| EP | 0 262 321 | 4/1988 |

* cited by examiner

Primary Examiner—Stefan Staicovici
(74) Attorney, Agent, or Firm—Oblon, Spivak, McClelland, Maier & Neustadt, P.C.

(57) ABSTRACT

A plurality of joined members each made of thermoplastic resin and having a fluid flow path formed of a groove and/or a hole in a junction face are vacuum-packed in a state in which the joined members are joined to each other. After a wrapped body obtained by the vacuum-packing is heated to soften the joined members, the joined members are welded to each other through the junction faces by applying fluid pressure to an entire outer periphery of the wrapping to evenly pressurize the wrapping from a periphery. Then, the pressurization is cancelled to cool the welded joined members.

12 Claims, 3 Drawing Sheets

EVEN PRESSURE WELDING METHOD BY USING FLUID PRESSURE

TECHNICAL FIELD

The present invention relates to an even pressure welding method by using fluid pressure and for joining a plurality of joined members made of thermoplastic resin by fluid pressure to produce a flow path member having therein a fluid flow path.

PRIOR ART

Conventionally, there is a known method as shown in FIG. 5 as a method for producing a flow path member having a fluid flow path. In this method, after fluid flow paths formed of holes or grooves are formed by machining in junction faces A of a plurality of joined members 1 and 2 made of thermoplastic resin, the joined members 1 and 2 are closely fitted in a metal mold 3 with the members 1 and 2 joined to each other through the junction faces A, the mold is closed with the junction faces A pressed against each other to heat and soften the joined members 1 and 2, and the joined members 1 and 2 are welded through the junction faces A by using expanding force of the resin at this time.

In the above prior-art producing method, however, it is difficult to closely fit the joined members 1 and 2 in the metal mold 3 without a gap in welding the joined members 1 and 2 and it is impossible to restrain the joined members 1 and 2 in an isotropic manner. Therefore, the joined members 1 and 2 are not evenly pressurized and warps are generated in the joined members 1 and 2.

Because the joined members 1 and 2 cannot be restrained in the isotropic manner and the joined members 1 and 2 are pressurized by using expanding force of the resin, control of pressure in welding the joined members 1 and 2 is difficult.

Furthermore, because it is necessary to produce the metal mold 3, there is a problem of the large number of man-hours needed, which should be overcome.

DISCLOSURE OF THE INVENTION

It is an object of the present invention to provide an even pressure welding method by using fluid pressure, the method being able to suppress a warp in welding joined members, to facilitate control of pressure in welding, and to reduce the number of man-hours.

The above and other objects and novel features of the invention will become apparent from the description of the present specification and the accompanying drawings.

To achieve the above object, according to the invention, there is provided an even pressure welding method including the steps of: joining or layering a plurality of joined members each made of thermoplastic resin and having a fluid flow path formed of a groove and/or a hole in a junction face to each other with the fluid flow paths communicating with each other; vacuum-packing the joined members which have been joined to each other by housing the joined members in a wrapping having heat resistance, airtightness, and flexibility; heating a wrapped body obtained by the vacuum-packing to soften the joined members; welding the softened joined members to each other through the junction faces by applying fluid pressure to an entire outer periphery of the heated wrapping to evenly pressurize the wrapping from a periphery; and canceling the pressurization to cool the welded joined members.

According to the invention, because fluid is used as means for pressurizing the joined members, the joined members which have been joined can be evenly pressurized by the fluid from outside and reliably welded to each other, control of pressure in welding is easy, and it is possible to realize shortening of welding time and suppression of the warp in welding. Moreover, because it is unnecessary to produce a metal mold unlike the prior art, the number of man-hours can be reduced.

Furthermore, because the joined members are pressurized in a state in which the members are vacuum-packed, the pressurizing fluid used such as oil is prevented from adhering to the outer faces of the joined members, entering the groove and the hole of the joined members, and flowing between the junction faces of the joined members.

In the invention, a protecting plate for reinforcing the wrapping is preferably disposed between outer faces of the joined members in which the fluid flow paths open and the wrapping in vacuum-packing the joined members.

In the invention, the wrapped body may be heated by an oven and then immersed in and pressurized by the fluid in a pressure vessel or the pressurizing fluid may also function as heating means, the wrapped body may be immersed and heated in the pressurizing fluid, and then pressure of the pressurizing fluid may be increased to pressurize the wrapped body.

In the invention the joined members are preferably subjected to annealing so as to remove a warp due to heat in welding at a step of cooling the welded joined members.

The annealing is carried out in a reheating container such as an oven and an oil bath into which the joined members are moved from the pressure vessel or with the joined members immersed in the fluid in the pressure vessel by using the fluid as a heating medium.

DETAILED DESCRIPTION OF THE PREFERRED EMBODIMENT

Figure 1:
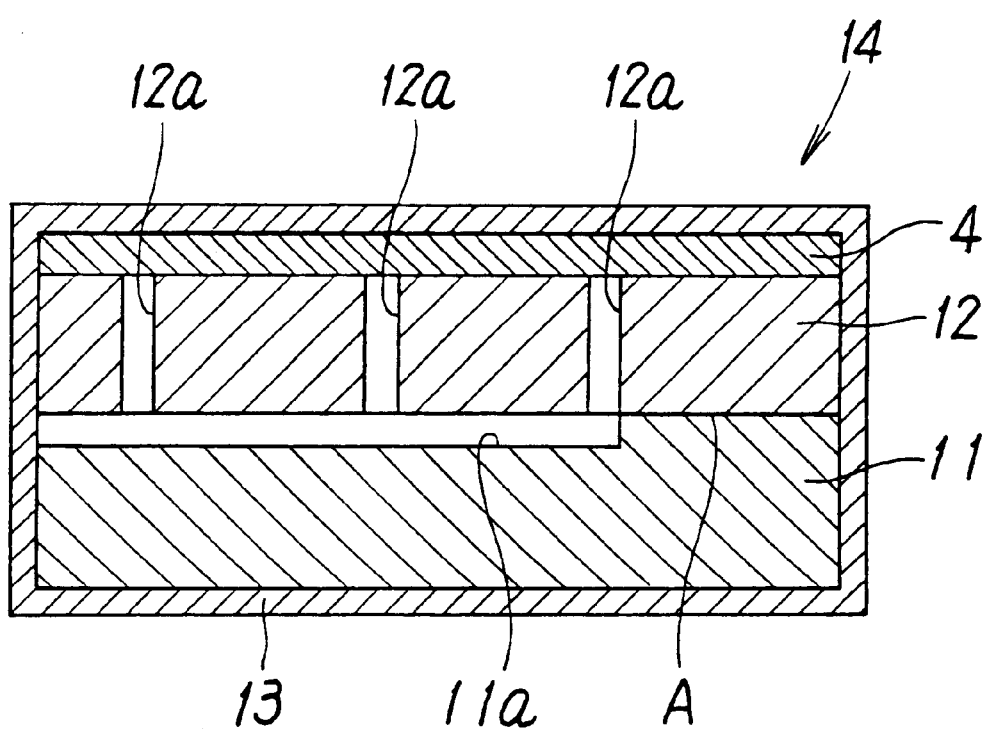
FIG. 1 is a sectional view showing a state in which joined members to be welded by a welding method of the present invention are vacuum-packed.

An embodiment of the present invention will be described below in detail based on the drawings. In description of the embodiment, components having the same functions are provided with the same reference numerals and described.

FIG. 1 shows a state in which members 11 and 12 to be joined to each other are vacuum-packed prior to welding. These joined members 11 and 12 are made of thermoplastic resin with transparent or translucent transmittancy such as acrylic resin, methacryl, polyvinylchloride, polycarbonate, and polyetherimide. These two plate-shaped joined members 11 and 12 are joined/layered together through their junction faces A to thereby form a flow path member.

Prior to forming a groove 11a, holes 12a, and the like which will be a fluid flow path in the joined members 11 and 12 by processing, the joined members 11 and 12 are heated to a required temperature when they are raw material in order to ensure dimensional stability. Then, the joined members 11 and 12 are preliminarily contracted by slowly cooling the joined members 11 and 12 for a sufficient time period, e.g., 5 to 8 hours. The heating temperature of the raw material in this case is about 140° C. when the joined members 11 and 12 are made of methacryl resin, for example, and the joined members 11 and 12 are held at the temperature for an appropriate time period required for preliminary contraction according to thicknesses of the raw material. However, the heating temperature is not necessarily 140° C. but may be an arbitrary temperature at which preliminary contraction can be carried out efficiently.

Next, the junction faces A between the joined members 11 and 12 which have been contracted preliminarily are subjected to machining by using a drill, an endmill, a reamer, and the like to form the groove 11a and the holes 12a. These groove 11a and holes 12a form the fluid flow path opening outside when the joined members 11 and 12 are joined to each other.

Surfaces of the joined members 11 and 12 which have been subjected to machining are washed in advance when the joined members 11 and 12 are heated and joined. As a washing method, a method in which ultrasonic waves are applied in a washing solution including a surface-active agent, for example, or in pure water, a method in which finish washing by using an ethylalcohol solution is carried out after the above washing, or the like is employed.

Although FIG. 1 shows the situation in which the plurality of holes 12a are formed in the joined member 12 and one groove 11a common to and communicating with the plurality of holes 12a is formed in the joined member 11 to be joined to the joined member 12, it is also possible to form a plurality of holes 12a communicating with supply holes, output holes, and discharge holes of a plurality of solenoid valves, for example, in the joined member 12 and to form a plurality of holes communicating with respective holes 12a in the joined member 11.

The groove 11a and the plurality of holes 12a can be used in a case in which the groove 11a is connected to a liquid supply source and an air supply source and a liquid such as a chemical agent and a detergent, air, or the like is supplied from this groove 11a through the plurality of holes 12a to an object or in a case in which the above liquid, air, or the like is sent from the plurality of holes 12a through the groove 11a to a common sending portion, for example.

In order to weld the joined members 11 and 12 obtained in the above manner to each other through the junction faces A, the joined members 11 and 12 are vacuum-packed with the junction faces A in close contact with each other as shown in FIG. 1. In vacuum-packing, a wrapping 13 with heat resistance, airtightness, and flexibility such as a film formed by coating an aluminum foil with resin is used. By housing the joined members 11 and 12 into the wrapping 13 which has been formed into a bag shape and producing a vacuum in the wrapping 13, a wrapped body 14 is obtained. In this case, because the groove 11a and the plurality of holes 12a are opening in outer peripheral faces of the joined members 11 and 12, the wrapping 13 has weak rigidity in portions corresponding to the groove 11a and the holes 12a. As a result, if pressurization by using hydraulic pressure is carried out in a later step, the wrapping 13 may be broken in the positions corresponding to the groove 11a and the holes 12a and oil B may enter from the breakages to contaminate flow path members. Therefore, it is preferable to carry out vacuum-packing while disposing a protecting plate made of rubber, metal, or the like and having proper degrees of rigidity and elasticity between outer faces of the joined members 11 and 12 where the groove 11a and the holes 12a open and the wrapping 13 so as to close the groove and the holes to prevent breakage of the wrapping 13.

Figure 2:
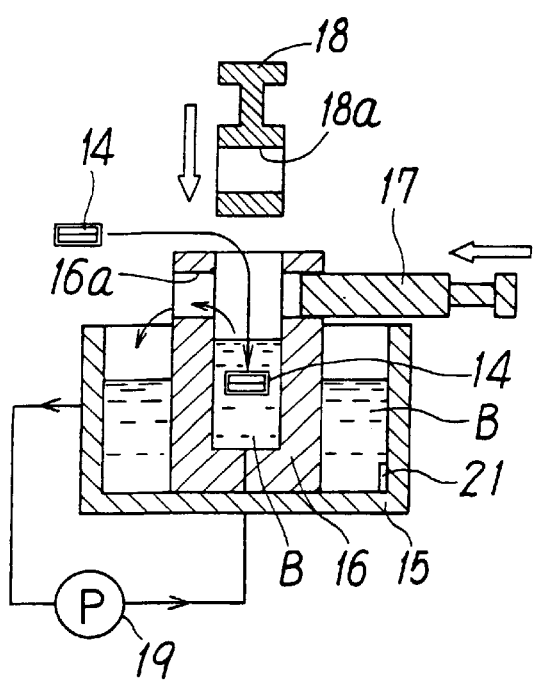
FIG. 2 is a sectional view of an essential portion showing a step in the welding method of the invention.

Next, as shown in FIG. 2, the wrapped body 14 is housed in a pressure vessel 16 filled with pressurizing fluid such as the oil B and immersed in the oil B. The oil B also functions as a heating medium. The temperature of the oil B is increased to a necessary temperature by a heater 21 in an oil vessel 15 and then the oil B is supplied into the pressure vessel 16 by a circulating pump 19. By immersing and heating the wrapped body 14 in the oil B for a certain time period, the joined members 11 and 12 are softened to such a degree that the joined members 11 and 12 can be welded. A preferable heating temperature at this time is 125° C., for example, and a preferable heating time is about one and a half hours, for example.

The pressure vessel 16 is in a shape of a closed-end tube and disposed in the oil vessel 15 in which the oil B is stored. In pressurization of the wrapped body 14, a lid 18 is detachably fitted in an opening portion at an upper end of the pressure vessel 16 and airtightly fixed by a fixing pin 17. The temperature of the oil B in the oil vessel 15 is increased to a necessary temperature by the heater 21 while the oil B is heating the wrapped body 14 and the temperature of the oil B in the pressure vessel 16 is maintained constant by circulating the oil B between the oil vessel 15 and the pressure vessel 16 in such a manner that the oil B is supplied into the pressure vessel 16 by the circulating pump 19 and then overflows through a lateral hole 16a to flowback into the oil vessel 15.

Figure 3:
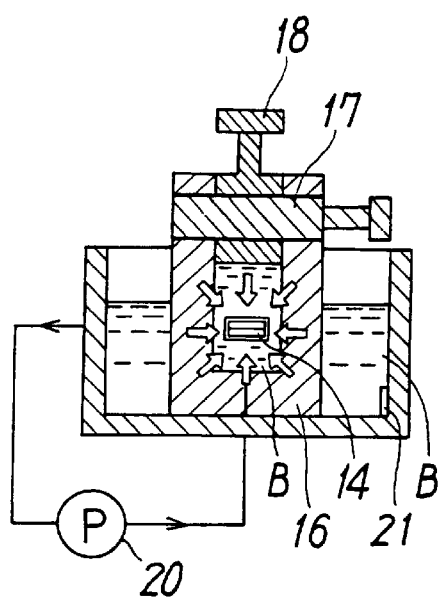
FIG. 3 is a sectional view of an essential portion showing another step in the welding method of the invention.

When heating of the wrapped body 14 has completed, the lid 18 is attached to the pressure vessel 16 to thereby make an inside of the pressure vessel 16 airtight as shown in FIG. 3. In the pressure vessel 16 and the lid 18, lateral holes 16a and 18a communicating with each other are formed respectively. By laterally inserting the fixing pin 17 into the lateral holes 16a and 18a, the lid 18 is fixed firmly so as not to come out accidentally due to internal pressure of the pressure vessel 16.

Then, by pressurizing the oil B in the pressure vessel 16 by a pressurizing pump 20, the joined members 11 and 12 are pressurized evenly by hydraulic pressure from outside the wrapping 13 and are welded to each other through the junction faces A. At this time, preferable pressure is about 10 Mpa and preferable pressurizing time is about 10 minutes.

Figure 4:
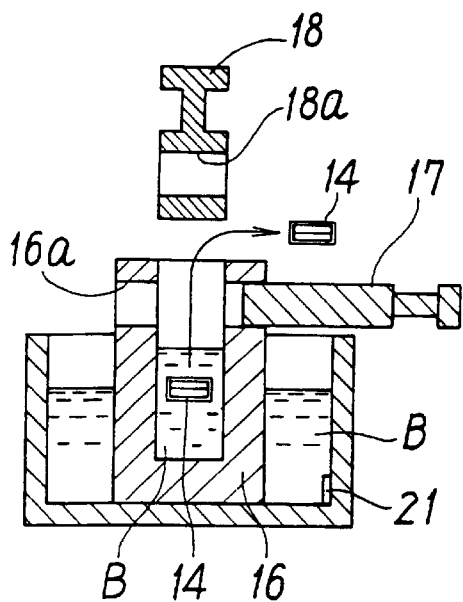
FIG. 4 is a sectional view of an essential portion showing yet another step in the welding method of the invention.
Figure 5:
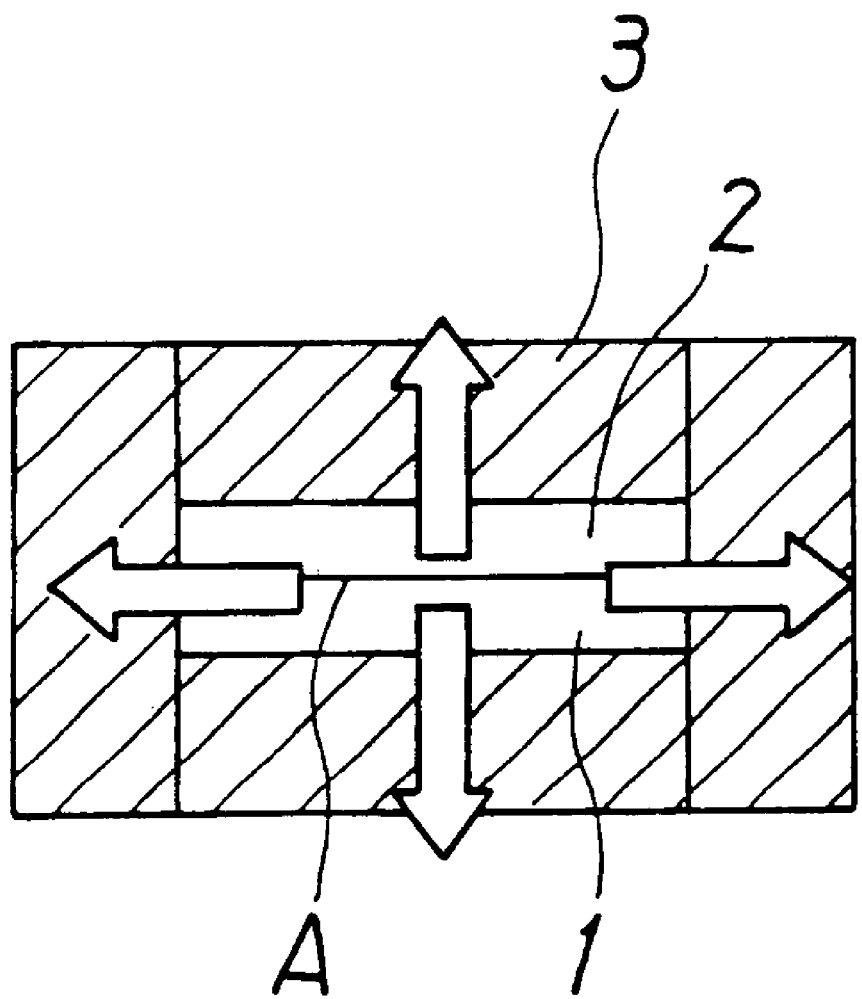
FIG. 5 is a sectional view showing a prior-art method for welding joined members.

When the welding step has been finished, pressurization is cancelled and the lid 18 is detached as shown in FIG. 4. By taking the wrapped body 14 out of the pressure vessel 16 and cooling the wrapped body 14, the flow path member in which the two joined members 11 and 12 are integrated can be obtained.

The cooling step is preferably carried out gradually for a sufficient time period, e.g., 10 hours or more such that a warp due to heat in welding the joined members 11 and 12 does not remain in the flow path member. However, it is also possible to carry out annealing at the cooling step so as to remove the above-described warp. This annealing can be carried out by moving the wrapped body 14 from the pressure vessel 16 into a container for reheating such as an oven and an oil bath (not shown), maintaining a temperature of the wrapped body 14 at about 80° C. which is lower than the temperature in the heat welding for a certain time period in this container, and then leaving the wrapped body 14 to slowly cool by itself for 8 to 10 hours, for example, or by maintaining the wrapped body 14 at a necessary temperature while keeping the wrapped body 14 immersed in the oil B in the pressure vessel with the oil B functioning as a heat medium and then leaving the wrapped body 14 to gradually cool by itself with the oil B.

The heating temperature in welding the joined members 11 and 12 is desirably 110 to 130° C. in general and is more desirably about 120° C. (about 115 to 125° C.) so as to minimize softening of resin if the joined members 11 and 12 are made of the methacryl resin. If the joined members 11 and 12 are made of other synthetic resin materials, the heating temperature is desirably in such a range as to minimize softening of the synthetic resins to thereby suppress deformation due to heating.

On the other hand, a time period for which the joined members 11 and 12 are maintained in the pressurized state in welding is different depending on a kind of resin forming the joined members 11 and 12, thicknesses of the joined members 11 and 12, the temperature, and the like.

As described above, according to the even pressure welding method of the present embodiment, because fluid is used as means for pressurizing the joined members 11 and 12, both the members 11 and 12 can be evenly pressurized by the fluid from outside and reliably welded to each other, control of pressure in welding is easy, and it is possible to realize shortening of welding time and suppression of the warp in welding. Moreover, because it is unnecessary to produce a metal mold unlike the prior art, the number of man-hours can be reduced.

Furthermore, because the joined members 11 and 12 are pressurized in a state in which the members 11 and 12 are vacuum-packed, the pressurizing fluid such as oil is prevented from adhering to the outer faces of the joined members, entering the groove 11a and the holes 12a of the joined members, and flowing into between the junction faces A of the joined members 11 and 12.

Although the pressurizing oil B is also used as the heating medium and the wrapped body 14 is heated by the oil B for the certain time period and then the pressure of the oil B is increased to pressurize the wrapped body 14 in the above embodiment, it is also possible to heat the wrapped body 14 in another place by using a heater such as the oven and then to charge the wrapped body 14 into the pressure vessel 16 to thereby immerse and pressurize the wrapped body 14 in the oil B after heating. In this case, it is preferable to increase the temperature of the oil B to a necessary temperature such that the heated wrapped body 14 is not cooled more than necessary by the oil B in pressurization.

The transmittancy of the joined members 11 and 12 is not necessarily required and the members 11 and 12 may be opaque.

Although the case in which the two plate-shaped joined members 11 and 12 are welded to each other is shown, the shapes, number, and the like of the joined members 11 and 12 are not limited to those in the above case and the arbitrary number of joined members in arbitrary shapes can be welded to each other.

As the pressurizing fluid which can be used in the invention, there are other arbitrary kinds of fluid such as water and gas than the above-described oil.

As can be understood from the above description, according to the invention, because fluid pressure is used for welding of the joined members, it is possible to evenly pressurize the joined members which have been joined from outside to reliably weld the members to each other, the control of pressure in welding is easy, and it is possible to realize shortening of welding time and suppression of the warp in welding. Moreover, because it is unnecessary to produce the metal mold unlike the prior art, the number of man-hours can be reduced.

Furthermore, because the joined members are pressurized in a state in which the members are vacuum-packed, the pressurizing fluid such as oil is prevented from adhering to the outer faces of the joined members, entering the holes and the groove of the joined members, and flowing into between the junction faces of the joined members.

What is claimed is:

1. An even pressure welding method including the steps of:

layering a plurality of members each made of thermoplastic resin and having a fluid flow path formed of a groove and/or a hole in a junction face to each other with said fluid flow paths communicating with each other;

vacuum-packing said members which have been joined to each other by housing said members in a wrapping having heat resistance, airtightness, and flexibility;

heating a wrapped body obtained by said vacuum-packing to soften said joined members;

welding said softened members to each other through said junction faces by applying hydraulic pressure of a fluid to an entire outer periphery of said heated wrapped body to evenly pressurize said wrapped body from a periphery thereof and canceling said pressurization to cool said members.

2. A welding method according to claim 1, which comprises a protecting plate for reinforcing said wrapped body disposed between outer faces of said joined members in which said fluid flow paths open and said wrapped body.

3. A welding method according to claim 1, wherein said pressurizing fluid comprises a heating medium, said wrapped body is immersed and heated in said fluid filled into a pressure vessel, and then pressure of said fluid is increased to pressurize said wrapped body.

4. A welding method according to claim 1, wherein said wrapped body is heated by an oven and then immersed in and pressurized by said fluid in a pressure vessel.

5. A welding method according to claim 1, wherein said joined members are subjected to annealing so as to remove a warp due to heat in welding at a step of cooling said welded joined members.

6. A welding method according to claim 5, wherein said annealing is carried out in a reheating container into which said joined members are moved from said fluid in said pressure vessel.

7. A welding method according to claim 5, wherein said annealing is carried out with said joined members immersed in said fluid in said pressure vessel by using said fluid as a heating medium.

8. An even pressure welding method including the steps of:

layering a plurality of members each made of thermoplastic resin and having a fluid flow path formed of a groove and/or a hole in a junction face to each other with said fluid flow paths communicating with each other;

vacuum-packing said joined members which have been layered with each other by housing said joined members in a wrapping so as to form a wrapped body having heat resistance, airtightness, and flexibility with a protecting plate disposed between outer faces of said joined members in which said fluid flow paths open and said wrapped body;

heating the wrapped body obtained by said vacuum-packing to soften said joined members;

welding said softened joined members to each other through said junction faces by encapsulating said heated wrapping in pressurizing fluid in an airtight pressure vessel and evenly applying hydraulic pressure of said fluid to an entire outer periphery of said wrapped body to pressurize said wrapped body; and canceling said pressurization to slowly cool said welded joined members.

9. A welding method according to claim 8, wherein said wrapped body is heated by an oven and then immersed in and pressurized by said fluid in said pressure vessel.

10. A welding method according to claim 8, wherein said joined members are subjected to annealing so as to remove a warp due to heat in welding at a step of cooling said welded joined members.

11. A welding method according to claim 10, wherein said annealing is carried out in a reheating container into which said joined members are moved from said fluid in said pressure vessel.

12. A welding method according to claim 10, wherein said annealing is carried out with said joined members immersed in said fluid in said pressure vessel by using said fluid as a heating medium.

\* \* \* \* \*